US008908491B2

(12) United States Patent
Ehrlich et al.

(10) Patent No.: US 8,908,491 B2
(45) Date of Patent: Dec. 9, 2014

(54) METHOD FOR EVALUATING THE USABILITY OF A SUB-CARRIER OF A POWER-LINE SIGNAL

(75) Inventors: Hans-Juergen Ehrlich, Mannheim (DE); Markus Rindchen, Osthofen (DE)

(73) Assignee: Power Plus Communications AG, Mannheim (DE)

( * ) Notice: Subject to any disclaimer, the term of this patent is extended or adjusted under 35 U.S.C. 154(b) by 93 days.

(21) Appl. No.: 13/811,599

(22) PCT Filed: Jul. 20, 2011

(86) PCT No.: PCT/DE2011/001477
§ 371 (c)(1),
(2), (4) Date: Jan. 22, 2013

(87) PCT Pub. No.: WO2012/010163
PCT Pub. Date: Jan. 26, 2012

(65) Prior Publication Data
US 2013/0121163 A1 May 16, 2013

(30) Foreign Application Priority Data

Jul. 21, 2010 (DE) .......................... 10 2010 031 863
Nov. 19, 2010 (DE) .......................... 10 2010 051 710

(51) Int. Cl.
*H04J 11/00* (2006.01)
*H04L 12/26* (2006.01)
*H04B 3/54* (2006.01)

(52) U.S. Cl.
CPC ................ *H04L 43/08* (2013.01); *H04B 3/542* (2013.01); *H04B 2203/5495* (2013.01)
USPC ............................ 370/206; 370/328; 370/480

(58) Field of Classification Search
None
See application file for complete search history.

(56) References Cited

U.S. PATENT DOCUMENTS 7,158,013 B2   1/2007  Schwager et al.
8,170,081 B2 * 5/2012  Forenza et al. ................ 375/141
(Continued)

FOREIGN PATENT DOCUMENTS

DE     60312839 T2   12/2007
EP     2020758 A1    2/2009
EP     2154789 A1    2/2010

OTHER PUBLICATIONS

The International Bureau of WIPO, International Preliminary Report on Patentabilty (Translation of Written Opinion) for International Application No. PCT/DE2011/001477, issued Jan. 22, 2013, 5 pages, Switzerland.

(Continued)

*Primary Examiner* — Anh-Vu Ly
(74) *Attorney, Agent, or Firm* — Alston & Bird LLP

(57) ABSTRACT

The invention relates to a method for evaluating the usability of a sub-carrier of a BPL (broadband power-line) signal, in particular in order to avoid mutual influencing of the BPL signal and a further signal, wherein the BPL signal has a plurality of sub-carriers and one symbol can be transmitted in each of the sub-carriers. The method comprises the following steps: extracting a received value y[k] from a sub-carrier of a received BPL signal, rectifying the received value y[k] using an estimated transfer function $\hat{H}$ of the transmission channel, deciding on a symbol d[k] that is coded in the received value y[k], distorting the symbol d[k] using the estimated transfer function $\hat{H}$ of the transmission channel, calculating a difference between the received value y[k] and the processed signal d[k]·$\hat{H}$ and deciding on the usability of the sub-carrier on the basis of the difference y[k]−d[k]·$\hat{H}$.

17 Claims, 2 Drawing Sheets

(56) References Cited

U.S. PATENT DOCUMENTS

Figure 1:
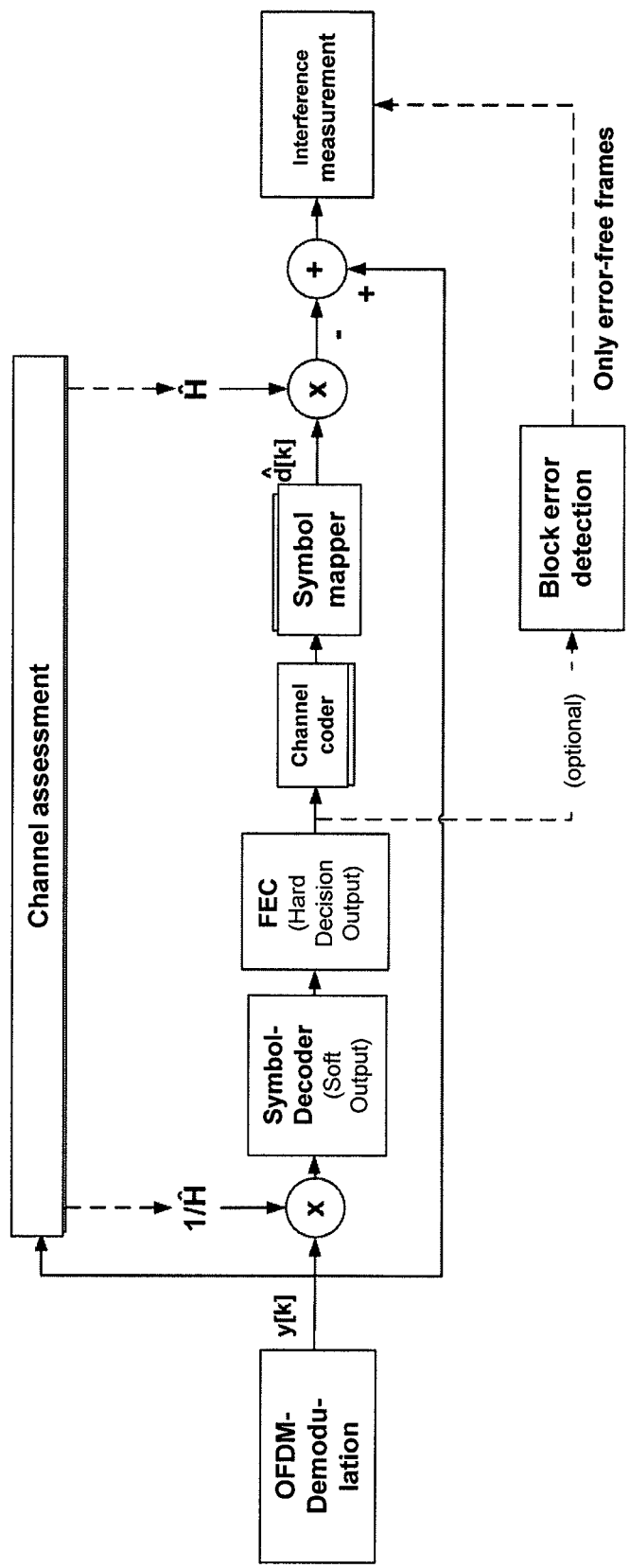

| | | | |
|---|---|---|---|
| 8,571,086 B2 * | 10/2013 | Forenza et al. | 375/141 |
| 8,654,815 B1 * | 2/2014 | Forenza et al. | 375/141 |
| 8,750,888 * | 6/2014 | Meiyappan | 455/450 |
| 2011/0142110 A1 | 6/2011 | Schwager | |

OTHER PUBLICATIONS

International Searching Authority, International Search Report for International Application No. PCT/DE2011/001477, mailed Nov. 30, 2011, 5 pages, European Patent Office, The Netherlands.

International Searching Authority, Written Opinion for International Application No. PCT/DE2011/001477, mailed Nov. 30, 2011, 5 pages, European Patent Office, Germany.

Mengi, Anil, et al., "Successive Impulsive Noise Suppression in OFDM," 2010 IEEE International Symposium on Power Line Communications and Its Applications, Mar. 28, 2010, pp. 33-37, IEEE, USA.

European Telecommunications Standards Institute 2008, "ETSI TS 102 578 V1.2.1, PowerLine Telecommunications (PLT), Coexistence between PLT Modems and Short Wave Radio Broadcasting Services," Aug. 2008, 16 pages, ETSI, France.

* cited by examiner

METHOD FOR EVALUATING THE USABILITY OF A SUB-CARRIER OF A POWER-LINE SIGNAL

CROSS REFERENCE TO RELATED APPLICATIONS

This application is a national stage application, filed under 35 U.S.C. §371, of International Application No. PCT/DE2011/001477, filed Jul. 20, 2011, which claims priority to German Application No. 10 2010 031 863.9, filed Jul. 21, 2010 and German Application No. 10 2010 051 710.0, filed Nov. 19, 2010, all of which are hereby incorporated by reference in their entirety.

BACKGROUND

1. Technical Field The invention relates to a method for assessing the feasibility of a sub-carrier of a BPL (Broadband Power Line) signal, particularly for avoiding a mutually influencing of the BPL-signal and another signal, with the BPL-signal comprising a plurality of sub-carriers and one symbol each can be transmitted in the sub-carriers.

2. Description of Related Art

In BPL (Broadband Power Line) communication data is transmitted via the power supply network. BPL is particularly used in buildings, however it may also be utilized to provide the "last mile", i.e. the connection of a buildings to a communication network. The data is modulated in a plurality of sub-carriers (for example 1536). The type of modulation is commonly selected separately for each sub-carrier depending on the quality of said sub-carrier. For example QPSK (Quadrature Phase Shift Keying) is used or 16 QAM (Quadrature Amplitude Modulation). The transmission usually occurs based on OFDM (Orthogonal Frequency Division Multiplexing). The BPL-frequency spectrum generally ranges from 2 MHz to 30 MHz, and thus overlaps the frequency used by various radio services. Due to the fact that a power supply network commonly is not optimized with regards to its emission behavior it cannot be excluded that the services and BPL-applications collide.

Accordingly, in practice certain frequency ranges "worth protecting" are excluded from the BPL-signal (notched), in order to avoid collisions and to ensure the coexistence of BPL and radio services. The notching of frequency ranges means in practice that individual sub-carriers of the BPL-signal are not utilized for data transmission.

In general, it can be distinguished between static and dynamic notching. In static notching one frequency range is permanently excluded, in order to protect particularly sensitive and/or safety-relevant services. Static notching can for example exclude amateur radio frequencies from the BPL-signal. In dynamic notching a frequency range is only excluded when a used signal of the radio service is actually present. Dynamic notching is presently only discussed for the frequencies of shortwave radio, because here the expansion of the service is subject to various physical phenomena, which are hard to predict. In reference to a static notching of radio transmitters, in this environment dynamic notching can increase the useful BPL-frequency spectrum by approx. 20%.

A technical challenge is presented in the detection of a shortwave signal "worth protecting", which shows the necessary transmitter field intensity for a common receiver. One potential concept for detecting such a signal is described in DE 603 12 839 T2. Prior to starting any PLC (Power Line Communication) activity the comprehensive frequency spectrum potentially used by the PLC-system is scanned and existing radio sources are detected. Alternatively or additionally it is described that gaps in the timeframe or the frequency band are used to detect radio transmitters. Gaps in the timeframe are considered times without any PLC-activity; gaps in the frequency band are frequency ranges not used for PLC-communication. Additionally, particular correlation methods are described for a further improvement of the detection mechanisms.

In the method described in DE 603 12 839 T2 it is disadvantageous that no PLC-activity may be present when applying the method. This leads to the consequence that the entire PLC-system or at best individual sub-carriers of the PLC-system must be switched off for detection or must be deactivated. When a wanted signal changes during operation of the system this cannot be addressed in a timely fashion because first the next following inactivity phase must be waited for or intentionally initiated. This may become necessary if, for example, a shortwave radio transmitter was poorly received during the most recent detection due to atmospheric disturbances. According to the specifications of the standard ETSI TS 102578 a notch in the BPL-signal must be effective within 15 seconds after a colliding radio system has become active, i.e. the BPL-signal may be interfering the radio system for a maximum of 15 seconds. When the atmospheric interference has ceased, clear reception must be made possible within 15 seconds once more.

BRIEF SUMMARY

The present invention is therefore based on the objective to provide and further develop a method of the type mentioned at the outset such that an assessment of the feasibility of a sub-carrier of a BPL-signal is also possible during ongoing operation of the BPL-system and simultaneously it can react in a timely fashion and effectively to any changing colliding signal sources.

According to the invention the above-stated objective is attained in the features of claim 1. Accordingly the method comprises the steps: extracting the received value y[k] from a sub-carrier of a received BPL-signal, equalizing the received value y[k] using an assessed transmission function $\hat{H}$ of the transmission channel, deciding for a symbol $\hat{d}[k]$, which is coded in the received value y[k], distorting the symbol $\hat{d}[k]$ with an assessed transmission function $\hat{H}$ of the transmission channel, forming a difference between the received value y[k] and the processed signal $\hat{d}[k] \cdot \hat{H}$, and deciding about the feasibility of the sub-carrier based on the difference $y[k] - \hat{d}[k] \cdot \hat{H}$.

In the manner according to the invention it initially has been recognized that for a reliable assessment of the feasibility of a sub-carrier in a BPL-signal it is not mandatory to wait for phases of inactivity and that it is not necessary, either, to intentionally trigger them. Rather, using a suitable signal processing during the ongoing operation of the BPL-system conclusions can be drawn for the presence of another signal in a sub-carrier. For this purpose, according to the invention first a received value y[k] is extracted from the sub-carrier of the BPL-signal to be assessed. The extraction occurs usually by a demodulation of the BPL-signal. For example, if the BPL-signal is modulated via OFDM, the received value y[k] is formed by a OFDM-demodulation and represents a scanned value of a sub-carrier of the BPL-signal. A symbol is coded in the received value y[k], which is extracted in the subsequent steps. For this purpose, first the received value y[k] is equalized.

The symbol transmitted in the sub-carrier via the transmission channel is distorted during the transmission by the transmission channel. The distortion may comprise a phase shift, a distortion of the amplitude, and/or the like. Mathematically the behavior of the transmission channel is described by its transmission function H. Usually an illustration via z-transformation is selected, because here the systems can be described rather easily. In most common transmission channels the transmission function H cannot be directly measured and thus it is assessed by a channel assessment, i.e. a transmission function $\hat{H}$ is determined, which most closely resembles the actual transmission function H. Methods for a channel assessment are known in practice. The channel assessment therefore yields an estimated transmission function $\hat{H}$. The assessed transmission function $\hat{H}$ is used for equalizing the received value y[k]. This usually occurs by dividing the received value y[k] by the assessed transmission function $\hat{H}$.

After the equalization of the received value a symbol $\hat{d}[k]$ is selected. This symbol $\hat{d}[k]$ represents a symbol which most probably has been sent by the transmitter. After the decision for a symbol $\hat{d}[k]$ has been made the assessed symbol $\hat{d}[k]$ is then distorted with the assessed transmission function $\hat{H}$. This usually occurs by multiplying the symbol $\hat{d}[k]$ with the transmission function $\hat{H}$. In the following the difference of the processed signal $\hat{d}[k]\cdot\hat{H}$ and the received value y[k] is formed. This way a signal is yielded, which is largely defined by cross-feeds on the transmission path and is largely independent from the symbol transmitted. These cross-feeds also include, in addition to interferences, other signals intended to be used as wanted signals for other services. Based on this difference it can be decided if the examined sub-carrier is feasible for the BPL-signal or not, i.e. to what extent cross-feeds are present in the sub-carrier caused by wanted signals. This way a method has been generated according to the invention which can be used during the operation of the BPL-system. The method according to the invention is quasi relying on a BPL-activity even, which in practice occurs more frequently than inactivity. The BPL-signal received by other BPL-modems is "listed into", and even several or all sub-carriers are assessed with regards to feasibility of the sub-carriers. The result of the assessment can then be considered when transmitting data via the BPL-system.

Preferably the decision about the feasibility of the sub-carrier is based on stochastic analyses. Preferably, the expected value of the difference y[k]−$\hat{d}[k]\cdot\hat{H}$ (and/or $\hat{d}[k]\cdot\hat{H}$−y[k]) is used here. This way the influence of arbitrary interferences can be eliminated. In order to avoid the influence of the algebraic sign of the difference y[k]−$\hat{d}[k]\cdot\hat{H}$ preferably the squared amount of the difference is used for the determination of the expected value:

$$\hat{I}=E\{y[k]-\hat{d}[k]\cdot\hat{H}\}$$

In order to increase the reliability of the expected value preferably a higher number of squared amounts of the difference is determined within several measurements and used for the determination of the expected value. Preferably at least 100 measurements are used, in a particularly preferred method even at least 1000 measurements. This way, a high quality and very high reliability of the expected value can be ensured. Due to the fact that the received values are received with a relatively high frequency in the modem a very reliable received value can be formed within a short period of time. Here, not every received value needs to be considered. Rather after the processing of the calculations for one received value the next detected received value can then be used for the other calculations. Any continuous assessment of the sub-carrier for all received values is possible in principle, however it is not necessary.

With regards to a particularly simple assessment, the feasibility of the sub-carrier is decided using a threshold decider. For this purpose, the expected value formed is compared to a predetermined threshold. The threshold may be determined empirically. Due to the fact that the expected value represents a measure for the signaling power of the other signal or generally represents a source for interference, the threshold can be selected such that the feasibility of the other signal is ensured for said other signal by a commercial receiver. This means if, for example, the other signal is formed by a short-wave radio signal and the commercial receiver by a shortwave radio receiver the threshold should be selected such that a radio signal which can be received with sufficient strength can be processed by the radio device. When the threshold is exceeded the sub-carrier would be used to capacity in the BPL-signal. When the threshold is fallen short the use of the sub-carrier would continue. This way, an assessment value can be formed in a very simple manner and without extensive calculation expense.

In order to ensure that the interference by additional signal sources becoming active is as low as possible the assessment of the sub-carrier is preferably performed periodically. Here, the length of the periods is preferably less than 15 seconds. It is particularly preferred for the period length amounting to a range of seconds measured in low single-digits, in order to ensure any interference of the other signal sources to be as short as possible. Ultimately here, after the expiration of the period length, a new assessment is respectively performed.

If the feasibility of the sub-carrier is decided positively, said sub-carrier can remain in use. If the sub-carrier was previously assessed as non-feasible and the assessment now finds that the sub-carrier is feasible, the release of the sub-carrier is initially postponed. Only if the sub-carrier has been assessed as suitable for a certain period of time is the activity on this sub-carrier reinstated. According to ETSI TS 102578 this period must amount to 180 seconds.

Preferably, the step of positively deciding on a symbol occurs via the signal decoder and a symbol mapper. Here, first the equalized received signal is decoded via a signal decoder. After decoding the equalized received value the decoded symbols is allocated via the symbol mapper to a symbol $\hat{d}[k]$, which most probably has been sent. This way, for example when modulating with the use of a QPSK (Quadrature Phase Shift Keying) initially the received symbol value is decoded and then it is decided for an allocation to one of the four quadrants and thus the allocation to a symbol. Then $\hat{d}[k]$ is given the value of this symbol.

In another improved embodiment an error correction is performed between the signal decoder and the symbol mapper. This way, the influences of arbitrary interferences on the transmission path can be reduced. Preferably a forward error correction (FEC) occurs. Suitable methods for FEC are known in practice.

In another even further improved embodiment a block error recognition is performed. Here, a complete frame of the BPL-signal is examined over all sub-carriers used and the corrected reception of the entire frame is analyzed. For a further improvement of the method according to the invention only those frames are used for the assessment which have been received correctly. This way the influence of broadband pulse interferences can be considerably reduced or eliminated entirely.

Here, it shall be pointed out that the use of error recognition and error correction methods may contribute to a further improvement, however these measures may be waived in favor of a lower calculation expense.

In a preferred embodiment the additional signal represents a radio signal, the mutual interference with the BPL-signal shall be examined. Here, particularly radio signals, particularly shortwave radio signals, shall be mentioned. Other signals may include amateur radio signals. Here, it shall be pointed out that in principle all signal sources could be examined which are included in the BPL-frequency spectrum.

The sub-carriers to be assessed may be preselected in order to reduce the expense for calculation. Here, a list of frequencies potentially subject to protection may be available to be considered for the assessment of feasibility of sub-carriers. For example, all received shortwave radio transmitters that can be received in principle may be included in this list. Only in the event that another signal could be included in a sub-carrier or in a certain range near the sub-carrier then an assessment of the sub-carrier would be performed. The expense can be considerably reduced in a simple fashion due to the fact that the relevant radio frequencies are regulated in almost every state on earth and thus lists of frequencies potentially subject to protection are easily available or can easily be prepared. Usually, here only a fraction of the utilized sub-carrier must be examined for its feasibility.

In a particularly preferred use of the method according to the invention the result of the assessment would be used to determine notching parameters for a BPL-signal. Frequencies are blocked in the BPL-signal in a targeted fashion by this notching. This blocking commonly occurs by the use of a notch filter, which may be performed digitally or analog. Embodiments of notch filters are known to one trained in the art in the context of BPL-signals. Based on the assessment of a sub-carrier, performed using the method according to the invention, a decision can be made for or against the omission of the sub-carrier. If the omission of a sub-carrier is decided, the mean frequency of the notch-filter as well as its bandwidth could be determined as the notching parameters. Preferably the mean frequency of the notch filter is selected equivalent to the mean frequency of the sub-carrier. The bandwidth of the notch filter is preferably a multiple of 5 kHz. In a particularly preferred manner a bandwidth of 10 kHz is selected.

In the implementation of the method according to the invention the specification for calculation could be implemented in the hardware, for example in a FPGA (Field Programmable Gate Array) or an ASIC (Application Specific Integrated Circuit). This way, the calculations could be performed very efficiently. Simultaneously several calculation strands could be embodied parallel so that several sub-carriers can be examined at the same time. In principle, all sub-carriers may also be assessed simultaneously.

There are various options to beneficially embody and further develop the teaching of the present invention. For this purpose, reference is made on the one hand to the claims dependent on claim 1 and on the other hand to the following explanation of two preferred embodiments of the invention using the drawing. In connection with the explanation of the preferred exemplary embodiments of the invention based on the drawing in general the preferred embodiments and further developments of the teaching are also explained. The drawing shows:

DETAILED DESCRIPTION OF THE DRAWINGS

Figure 2:
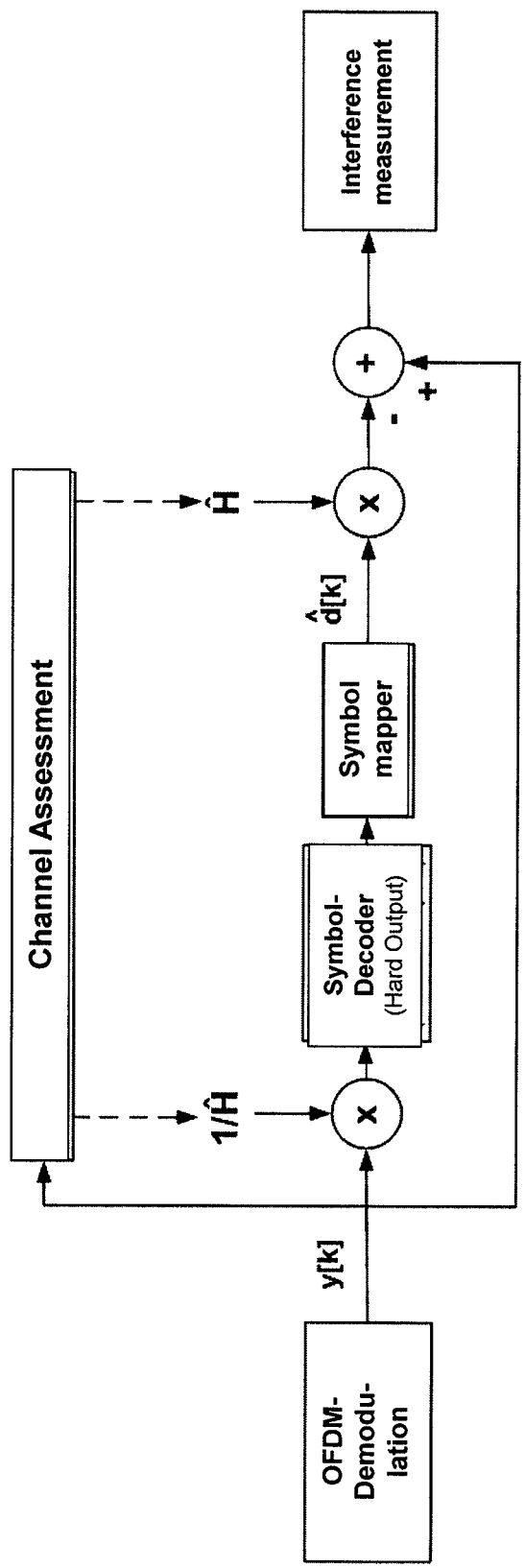

FIG. 1 a block diagram of a first exemplary embodiment of the method according to the invention with a forward error correction, and FIG. 2 a block diagram of a second, simplified exemplary embodiment of a method according to the invention.

DETAILED DESCRIPTION OF VARIOUS EMBODIMENTS

FIG. 1 shows a block diagram of a first exemplary embodiment of a method according to the invention. In a first block an OFDM-demodulation is performed. Here, a BPL-signal modulated with OFDM and transmitted via a transmission channel to a receiver is appropriately demodulated. The OFDM demodulation yields a series of received values y[k], each of which representing one sub-carrier of the BPL-signal. FIG. 1 illustrates a processing of an individual received value y[k] in a sub-carrier. In a first path of the block diagram the received value y[k] is fed to a channel assessment, which yields an assessed transmission function $\hat{H}$ of the transmission channel. On a second path y[k] is multiplied with the inverse value of the assessed transmission function H. The result y[k]/$\hat{H}$ represents the equalized signal received y[k]. By the multiplication with the assessed transmission function the distorted influences of the transmission channel are largely eliminated. Due to the fact that this represents only an assessment of the transmission function the equalization is subject to errors, however it represents a good approximation of the actual transmission function, depending on the quality of the assessed channel model. Suitable assessment models to perform a channel assessment are known to one trained in the art from practice.

The received value equalized in this manner is fed to a symbol decoder. The symbol decoder provides a point in the symbol range stretched by the symbols which perhaps may be transmitted. When using a QPSK, the range of symbols represents a two-dimensional level, the result of the symbol decoder a point in one of the quadrants of the range of symbols. The value issued by the symbol decoder is fed to a forward error correction FEC. Here, most different forward error corrections may be performed which are known in practice. While the symbol decoder yields a "soft decision", the forward error correction performs a "hard decision". The hard decision—values yielded in this manner are converted by a channel decoder into code bits and by a subsequent symbol mapper converted into the respective symbol values. This way, "interference cleared" symbol values $\hat{d}[k]$ form, which most probably are equivalent to the transmitted symbol sequence $\hat{d}[k]$.

Subsequently the assessed transmission symbol $\hat{d}[k]$ is distorted using the assessed transmission function $\hat{H}$ of the transmission channel. The distortion occurs by multiplying the assessed symbol with the transmission function $\hat{H}$. The result of the multiplication is fed with a negative algebraic sign to an adding station, with its second input being connected to a third path of the block diagram and is directly fed with the value received y[k]. This way the difference is formed between the actual value received y[k] and the "cleaned" value received $\hat{d}[k]\cdot\hat{H}$. After squaring the amount of the difference y[k]−$\hat{d}[k]\cdot\hat{H}$ via a plurality of symbols, i.e. a plurality of measurements and differences calculated, an expected value $\hat{I}$ is formed with $$\hat{I}=E\{y[k]-\hat{d}[k]\cdot\hat{H}\}$$

The expected value formed in this way represents a measure for the cross-feed of other signal sources into the sub-carrier. In FIG. 1 this step is characterized in the last block with the lettering "interference measurement".

For the interference measurement optionally the result may be used for block error detection. For this purpose the signal can be separated after the forward error correction FEC and fed to block detection. The block detection forms error detection over the entire BPL-range. Here, it can be decided if all simultaneously received symbols have been transmitted without interference or at least could be corrected. In order to improve the interference measurement only those ranges may be considered for assessment which have been received free from errors.

The block diagram shown in FIG. 1 describes the interference measurement for a sub-carrier. The difference value yielded in this manner can be fed to a threshold decider, by which the crossing of a threshold can be assessed. If a predetermined threshold is exceeded the power of the interference signal is "excessive" and a notch must be used on the respective sub-carrier in order to prevent the signal to be further disturbed by the sub-carrier.

FIG. 2 shows a simplified block diagram for the interference measurement. In the block diagram according to FIG. 2 no error correction blocks are included. This way, the expense for implementation is considerably lower, however still comparatively good interference measurements can be performed. Starting with an OFDM demodulation the received value y[k] is fed in a first path to a channel assessment, which yields an assessed transmission function $\hat{H}$. In a second path the received value y[k] is multiplied with the inverse value of the assessed transmission function $\hat{H}$ and the result y[k]/$\hat{H}$ is fed to a symbol decoder, which then yields a hard decision output. The output of the symbol decoder is fed to a symbol mapper, which yields an assessed symbol $\hat{d}$[k], which is multiplied via a multiplication member with the assessed transmission function $\hat{H}$. The symbol distorted in this manner is fed to a summing member in a negated form, with the third path of the block diagram being applied at its second end and the difference of the distorted symbol $\hat{d}$[k]·$\hat{H}$ and the value received y[k] is formed. The difference is supplied to an interference measurement and here an expected value is formed via the squaring of the amount of the difference y[k]−$\hat{d}$[k]·$\hat{H}$. The result is used analog to FIG. 1.

Ultimately a measurement of the interference power is performed via re-modulation and an assessment measure can be determined for the feasibility of the respective sub-carrier.

With regards to additional advantageous embodiments of the device according to the invention reference is made to the general part of the description as well as the attached claims in order to avoid repetitions.

Finally, it shall be explicitly pointed out that the above-described exemplary embodiments of the method according to the invention only serve to explain the claimed teaching, however it is not limited to the exemplary embodiments

The invention claimed is:

1. A method for assessing the feasibility of a sub-carrier of a Broadband Power Line (BPL) signal, particularly for avoiding the mutual influence of the BPL-signal and an additional signal, with the BPL-signal comprising a plurality of sub-carriers and with one symbol each able to be transmitted in the sub-carriers, comprising the steps:
    extracting a received value y[k] of the BPL-signal received from a sub-carrier wherein k is an integer;
    equalizing the received value y[k] using an assessed transmission function $\hat{H}$ of a transmission channel;
    determining a symbol $\hat{d}$[k], which is coded in the received value y[k];
    distorting the symbol $\hat{d}$[k] with an assessed transmission function CI of the transmission channel, said distorting of the symbol $\hat{d}$[k] resulting in a processed signal $\hat{d}$[k]·$\hat{H}$;
    forming a difference between the received value y[k] and the processed signal $\hat{d}$[k]·$\hat{H}$; and
    deciding about the feasibility of the sub-carrier based on the difference y[k]−$\hat{d}$[k]·$\hat{H}$.

2. A method according to claim 1, wherein the feasibility of the sub-carrier is decided based on the expected value of the squared amount of the difference y[k]−$\hat{d}$[k]·$\hat{H}$, with the expected value being formed via a plurality of differences.

3. A method according to claim 2, wherein the plurality of differences comprise at least 100 differences.

4. A method according to claim 2, wherein the plurality of differences comprise at least 1000 differences.

5. A method according to claim 1, wherein the decision about the feasibility of the sub-carrier is formed via a threshold decider, whereby when a predetermined threshold is fallen short of, the sub-carrier is used and upon crossing the threshold the sub-carrier is blocked.

6. A method according to claim 1, wherein the assessment of the sub-carrier is performed periodically.

7. A method according to claim 6, wherein the assessment of the sub-carrier is performed with a period term of less than 15 s.

8. A method according to claim 1, wherein, in the step of determining the symbol, an equalized signal is decoded via a signal decoder and the decoded symbol is allocated via a symbol mapper to a symbol $\hat{d}$[k], which most probably has been transmitted.

9. A method according to claim 8, wherein an error correction is performed between the signal decoder and the symbol mapper.

10. A method according to claim 9, wherein the error correction is a forward error correction.

11. A method according to claim 1, wherein a block error detection is performed and only those scopes influence the BPL-signal which have been correctly received.

12. A method according to claim 1, wherein the additional signal comprises a transmitted signal.

13. A method according to claim 12, wherein the transmitted signal comprises at least one of a radio signal and an amateur radio signal.

14. A method according to claim 12, wherein the sub-carriers to be assessed are pre-selected based on a predetermined list of frequencies potentially subject to protection.

15. A method according to claim 1, wherein the result of the assessment is used to determine notching parameters for a BPL-signal, whereby frequencies in the BPL-signal are blocked by the notching parameters, whereby an assessment of a sub-carrier being performed, and whereby based on the assessment of the sub-carrier a decision is made for or against the blocking of the sub-carrier.

16. A method according to claim 15, wherein a notch filter is used to block the sub-carrier, whereby the mean frequency of the notch filter being equivalent to the mean frequency of the sub-carrier and whereby the notch filter preferably showing a bandwidth of a multiple of 5 kHz.

17. A method according to claim 16, wherein the bandwidth is 10 kHz.

* * * * *